(12) United States Patent
Chen

(10) Patent No.: US 6,836,792 B1
(45) Date of Patent: Dec. 28, 2004

(54) TECHNIQUES FOR PROVIDING ADD-ON SERVICES FOR AN EMAIL SYSTEM

(75) Inventor: Samuel Chen, Fremont, CA (US)

(73) Assignee: Trend Micro Incorporated, Cupertino, CA (US)

( * ) Notice: Subject to any disclaimer, the term of this patent is extended or adjusted under 35 U.S.C. 154(b) by 0 days.

(21) Appl. No.: 09/454,469

(22) Filed: Dec. 3, 1999

(51) Int. Cl.$^7$ .......................................... G06F 15/177
(52) U.S. Cl. ..................... 709/220; 709/203; 709/223; 709/229
(58) Field of Search ....................... 709/220, 203, 709/223, 229, 226, 206

(56) References Cited

U.S. PATENT DOCUMENTS

| | | | |
|---|---|---|---|
| 5,444,850 A | 8/1995 | Chang | 395/200.1 |
| 5,623,600 A | 4/1997 | Ji et al. | 395/187.01 |
| 5,680,547 A | 10/1997 | Chang | 395/200.01 |
| 5,838,790 A * | 11/1998 | McAulliffe et al. | 380/4 |
| 5,889,943 A | 3/1999 | Ji et al. | 395/187.01 |
| 5,951,698 A | 9/1999 | Chen et al. | 714/38 |
| 5,960,170 A | 9/1999 | Chen et al. | 395/183.14 |
| 6,035,104 A * | 3/2000 | Zahariev | 395/200.33 |
| 6,067,570 A * | 5/2000 | Kreynin et al. | 709/227 |
| 6,356,937 B1 * | 3/2002 | Montville et al. | 709/206 |
| 6,408,336 B1 * | 6/2002 | Schneider et al. | 709/229 |

* cited by examiner

*Primary Examiner*—Rupal Dharia
*Assistant Examiner*—Adnan Mirza
(74) *Attorney, Agent, or Firm*—Beyer Weaver & Thomas, LLP

(57) ABSTRACT

A method for providing add-on services responsive to an email transferred via a distributed computer network. The method includes receiving via the distributed computer network the email at an add-on service system. The method further includes ascertaining from the email whether a recipient of the email subscribes to at least one of the add-on services. If the recipient subscribes to the at least one of the add-on services, the method includes forming a post add-on service email, which includes performing, using the add-on service system, the at least one of the add-on services on at least a first portion of the email. Furthermore, the method includes forwarding the post add-on service email, after the performing, to the email system, thereby rendering the post add-on service email accessible to the recipient through the email system.

14 Claims, 6 Drawing Sheets

TECHNIQUES FOR PROVIDING ADD-ON SERVICES FOR AN EMAIL SYSTEM

BACKGROUND OF THE INVENTION

The present invention relates to systems and methods for providing add-on services to emails transferred via a distributed computer network. More particularly, the present invention relates to techniques for providing add-on services responsive to emails received at an email system, which techniques require little change to the email system itself.

Emails and email systems for providing computer users with email communication via a distributed computer network, such as the Internet, have been around for some time. In a typical Internet-based email system, a computer user typically employs an Internet-based email application program (e.g., Yahoo™ mail or another email front end that is accessible via a web browser) or a desktop-based email application program (e.g., Outlook™ by Microsoft Corp.), to compose an email. To direct the email to reach the intended recipient, the sender may provide a unique recipient email address, which typically includes the recipient's user name and a domain name. Together, the recipient's user name and the domain name comprise a unique email address.

Once the sender or a program (generically referred herein simply as the sender to simplify discussion) issues the command to send the composed email to the specified unique email address, the email message, with the unique recipient email address as its header, is sent via the distributed computer network, e.g., the Internet, to an email service provider that services the specified domain. Along the way, the email typically passes through a plurality of mail relay stations, using the store-and-forward paradigm. Once the email arrives at the email service provider that services the specified domain, the email system may notify the recipient that he has an email waiting to be retrieved, or the email system simply waits until the recipient logs in to check his email folder to inform him of the existence of a new email to be read.

To facilitate discussion, FIG. 1 illustrates a simplified representation of a typical email arrangement which allows email senders 102 and 104 to transmit emails to an email recipient 106. With reference to FIG. 1, email sender 102 may employ an email front end 108, which as mentioned earlier may either be a browser-based email application program or a desktop-based email application program that has a gateway to the Internet, to compose the desired email message and to specify the unique address of the email recipient. If the email system is HTTP-based (as in the case of front end 108A), a web-server 190 is typically employed to permit the email to be transferred in the SMTP format. If the email front-end employs the SMTP format (as in the case of front end 108B).

After the email is composed, email sender 102 may command email front end 108 to transmit the email to email recipient 106 by issuing a send command. When email front end 108 receives the send command, it forwards the composed email message, including the recipient email address as its header, to distributed computer network 110, which in this case is the Internet. Internet 110 is represented, as is conventional, by a cloud within this cloud that symbolically represents the Internet, the email system that provides email service for the domain specified in the email address resides. In the example of FIG. 1, such an email system is illustrated by an email system 130. Since email system 130 resides in the distributed computer network, the email message typically arrives at email system 130 through a plurality of connecting legs and relay facilities. To simplify the illustration, these relay facilities, which are distributed within Internet 110 between email front end 108 and email system 130, is illustrated by a relay cloud 132.

In the current art, emails relayed through the Internet also typically employ a suitable email protocol to allow the emails to be efficiently relayed to the appropriate destination. One such protocol is SMTP (Simple Mail Transfer Protocol). In the example of FIG. 1, the transmitted email is first received at email system 130 by an SMTP server 140. SMTP server 140 then ascertains whether the recipient is indeed one who is serviced by email system 130. Assuming that the email recipient is associated with a domain (e.g., "abc.com") which is serviced by email system 130, SMTP server 140 then forwards the email message to a database facility 142, which stores the received email message in an appropriate mail box accessible by the intended recipient of the email message.

Thereafter, email recipient 106 may employ an appropriate email front end 150 to access Internet 110 and ascertain, via web server 152 of email system 130, whether there is an email message waiting for email recipient 106 within database facility 142. If there is, email recipient 106 may access the email message by sending a command via email front end 150 to email system 130 to request the email message to be sent from email system 130 to email front end 150 to be displayed thereon.

If email front end 150 is implemented in a web browser that displays RTML-formatted pages or a similar protocol, an HTML converter facility 158 or an appropriate protocol converter facility may be employed to convert the email message to an appropriate format prior to sending the email message to email front end 150 via web server 152. The arrangement of FIG. 1 is conventional and may include other implementational details and variations, which are well known to those in the business of providing email service and will not be discussed in great detail here for brevity's sake.

As Internet revenue models evolve, email service has become one of the loss leader services that many portals or web businesses are expected to provide. In other words, many users expect free email service from their portals as a condition for their patronage. As a result, many providers of email systems have been forced to turn to advertisement revenue to operate and maintain their email systems. FIG. 2 illustrates a simplified exemplary prior art technique for providing advertisement-based emails using the basic architecture of FIG. 1. In the example of FIG. 2, an advertisement insertion module 170 interfaces with HTML converter facility 158 to insert an appropriate advertisement banner into the email message prior to sending the email message to email front end 150. In this manner, the emails are received by the recipients with advertisements inserted by the email system. This arrangement results in payment from the advertisers to the email system operator, which provides a revenue base for the provider of email system 130 to operate and maintain the email system.

As the Internet evolves further, email users begin to demand even more sophisticated services from their email system providers. By way of example, many email users nowadays demand the ability to redirect their emails to other domains to allow all their emails to be centralized at one email system. Another service that many email users also desire nowadays is auto-reply, wherein the email system automatically notifies the sender with a preselected message (e.g., "I am away for two weeks," "I got your message and I will get back in touch with you shortly," or the like). Some email users may desire to receive their emails in the form of voice or facsimile while they are on the road and may accordingly require these capabilities from their email system. Other security-related services, such as anti-spamming services, virus-scanning services, are also popular on the list of desirable features among email users.

For many email system providers, these demands represent a significant challenge. For one, most email services are provided to email users free of charge, which makes it difficult for email system providers to find the necessary financial resources to update their email systems to provide such services. More significantly, given the speed at which products and services associated with the Internet evolves, many email systems may have been designed earlier without advance knowledge of future services and features that users may eventually demand. As such, many existing email systems may have been designed without the necessary scalability and/or flexibility to allow these additional features to be readily and efficiently integrated. Even if such integration is possible, the task of integrating the new features into the legacy email systems may take an unacceptably long period of time, which may result in a loss of users and negative economic consequences for the portal operator.

By way of example, integrating a new feature into an existing legacy email system may require the staff of the email system to design codes implementing the new feature, to integrate the new codes into the existing software architecture, and to test/debug the updated email system prior to roll out. This assumes, of course, that the staff of the email system has the necessary expertise to implement the new feature and is knowledgeable about their legacy email system, which is often not the case if the operator merely leases the codes from a third party software developer (in which case, the email service operator may not even have access to the source code). Of course the email service operator may always negotiate with the third party software developer to have additional features implemented. However, this is also time-consuming, and the result depends for the most part on the willingness and expertise of the third party software developer to implement the new desired features.

Still further, it is oftentimes the case that by the time the email system operator realizes the need for a new feature, such new feature may have already been implemented elsewhere by another third party developer. In the typical situation, users often are aware of the existence of a new feature from other sources first and push for their own email system operators to offer the same feature. In such cases, it may be more efficient for the email service provider to lease or license the already implemented codes instead of writing new codes. However, if the email service provider wishes to integrate the codes representing the desired features with the codes of the legacy email system, compatibility, scalability, testing, and debugging issues still require time to resolve. Unless email system providers can find a way to quickly and efficiently integrate the new services and features into their legacy email systems, as well as find a way to finance the new services and features, they may lose users and/or suffer serious financial consequences.

In view of the foregoing, there are desired improved techniques for providing new services and features to users of an existing email system in a way that requires little change to the existing email systems and at little cost.

SUMMARY OF THE INVENTION

The invention relates, in one embodiment, to an add-on service system configured to provide add-on services to emails transferred via a distributed computer network. The add-on service system is configured to be coupled to an email system through the distributed computer network. The add-on service system includes a first server configured to receive, through the distributed computer network, an email eventually destined for the email system. The email includes an address of the add-on service system and an address of the email system. The add-on service system further includes a first logic module, operatively coupled to receive the email from the first server, for ascertaining whether a recipient of the email subscribes to at least one of the add-on services. The add-on service system additionally includes a second logic module, operatively coupled to receive a decision from the first logic module, for performing the at least one of the add-on services on at least a portion of the email if the first logic module ascertains that the recipient of the email subscribes to the least one of the add-on services, thereby forming a post add-on service email. Furthermore, the add-on service system includes a second server, operatively coupled to receive the post add-on service email from the second logic module. The second server is configured to forward the post add-on service email to the email system.

In another embodiment, the invention relates to a method for providing add-on services responsive to an email transferred via a distributed computer network. The method includes receiving via the distributed computer network the email at an add-on service system. The email includes both an identity of the add-on service system and an identity of an email system servicing an intended recipient of the email. The method further includes ascertaining from the email whether a recipient of the email subscribes to at least one of the add-on services. If the recipient subscribes to the at least one of the add-on services, the method includes forming a post add-on service email, which includes performing, using the add-on service system, the at least one of the add-on services on at least a first portion of the email. Furthermore, the method includes forwarding the post add-on service email, after the performing, to the email system, thereby rendering the post add-on service email accessible to the recipient through the email system.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
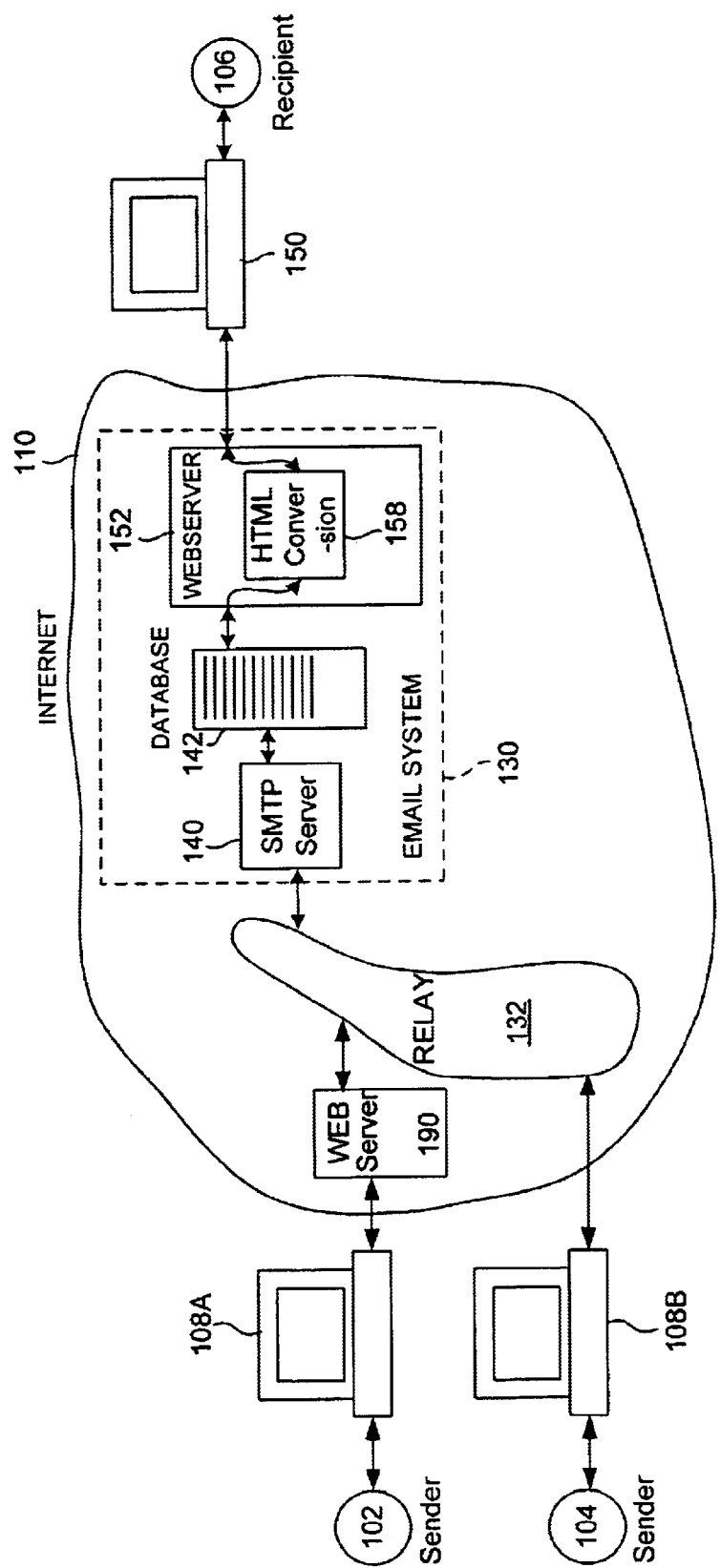
FIG. 1 illustrates a simplified representation of a typical email arrangement which allows email senders to transmit emails to an email recipient.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The invention relates, in one embodiment, to an improved technique for providing new services and features to an existing email system, and a method for financing the implementation of such new services and features in a manner so as to require little change to the existing email system and at little cost. In one embodiment, the add-on features are implemented by taking advantage of the store-and-forward paradigm of Internet-based emails such as SMTP. In one exemplary implementation, the module(s) for providing the add-on services responsive to the transmitted emails are implemented in a add-on service system, which is disposed along the path through which the transmitted email is relayed between the sender and the recipient's email system through the distributed computer network. Users (most likely the recipients but may also be the senders themselves) may then subscribe to selected add-on services, which cause these services to be performed whenever their emails are relayed through the add-on service system.

To ensure that emails associated with a user who has earlier registered for add-on services are routed through the add-on service system, these users may, in one embodiment, be given an email address which has a slightly different domain designation than one for users who do not subscribe to the add-on services. The different domain designation ensures that emails associated with a user who has earlier registered for add-on services are routed to the add-on service system, which performs the add-on service(s) responsive to the emails prior to relaying the emails to the destination email system. In another embodiment, the email address is unchanged irrespective whether a user has subscribed to an add-on service but the destination email system may track in its user profile database whether a particular user has registered for add-on services. For each email received, the user profile database is consulted and if the user has subscribed to one of the add-on services, the received email associated with the subscribing user is forwarded to a relay point where the middleware module is implemented. At the middleware module, the add-on services are performed.

Depending on the add-on services involved, the email may then be relayed back to the destination email system for eventual routing therefrom to the recipient's email front end. In this manner, very little change is required of the existing email system to allow add-on services to be offered by the email service provider. Further, since there is little change to the original email system, the reliability risks typically associated with integrating new features into an existing software system is substantially reduced. By way of example, if the codes implementing the add-on service at the add-on service system fail, the destination email system is unaffected.

In one embodiment, the add-on features for the email system are financially supported using revenue derived from electronic advertisement inserts, which may take the form of a visual, auditory, or other multimedia formats, included with the email at the add-on service system. Furthermore, the electronic advertisement inserts may be selected based on the user profile of past behavior (e.g., web navigation behavior (such as click pattern) among the various websites, electronic shopping behavior, or the like). Advantageously, these inserts also occur in a relay node that is different from the node where the email system service is implemented. This also contributes to minimizing the changes necessary to implement the add-on services. Furthermore, the electronic advertisement inserts that support the add-on service implementation are only inserted into emails that require the add-on services. For users who do not wish to subscribe to the add-on services, their emails are essentially unchanged with the implementation of the add-on services.

Figure 2:
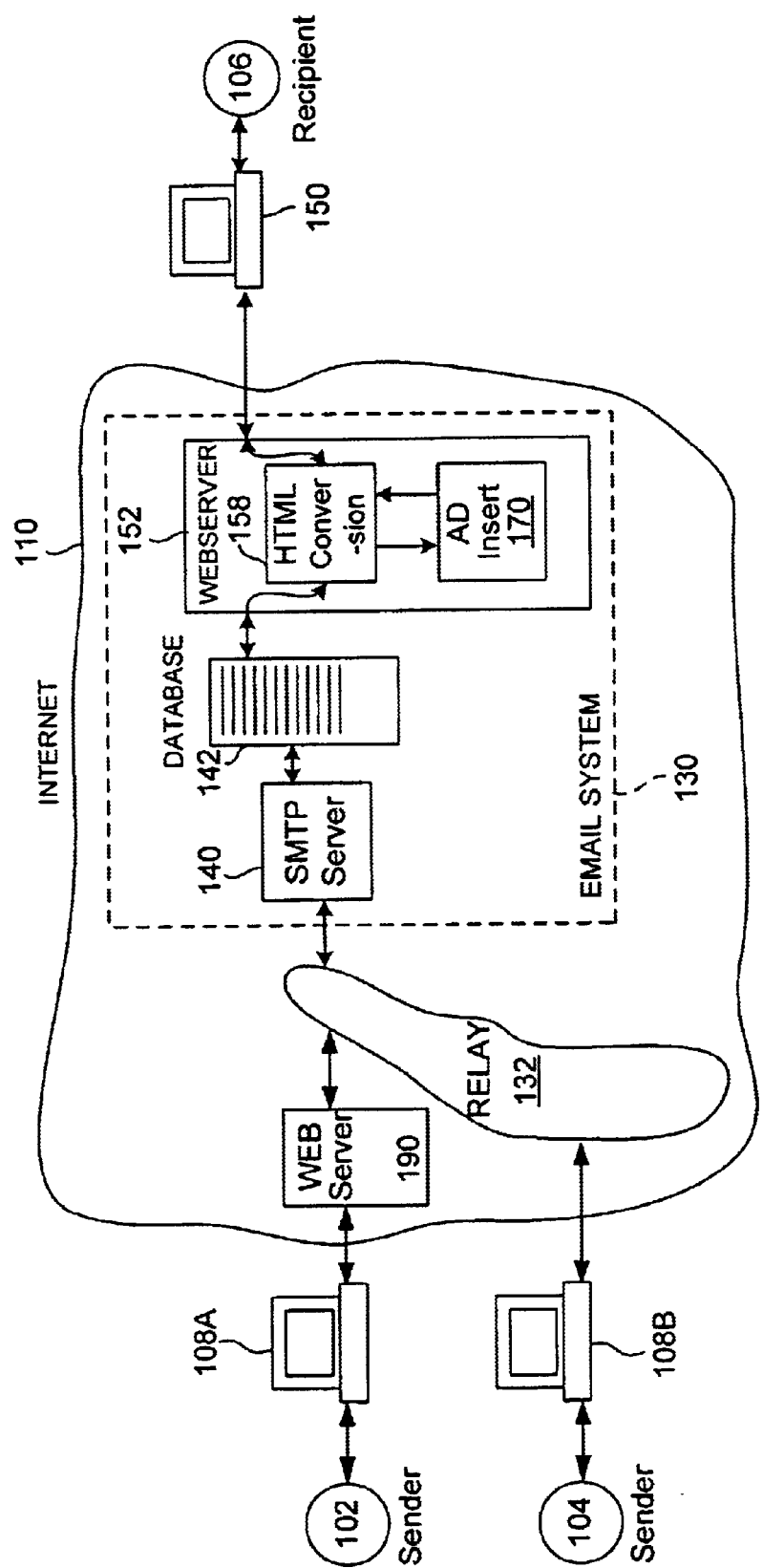
FIG. 2 illustrates a simplified exemplary prior art technique for providing advertisement-based emails using the basic architecture of FIG. 1.
Figure 3:
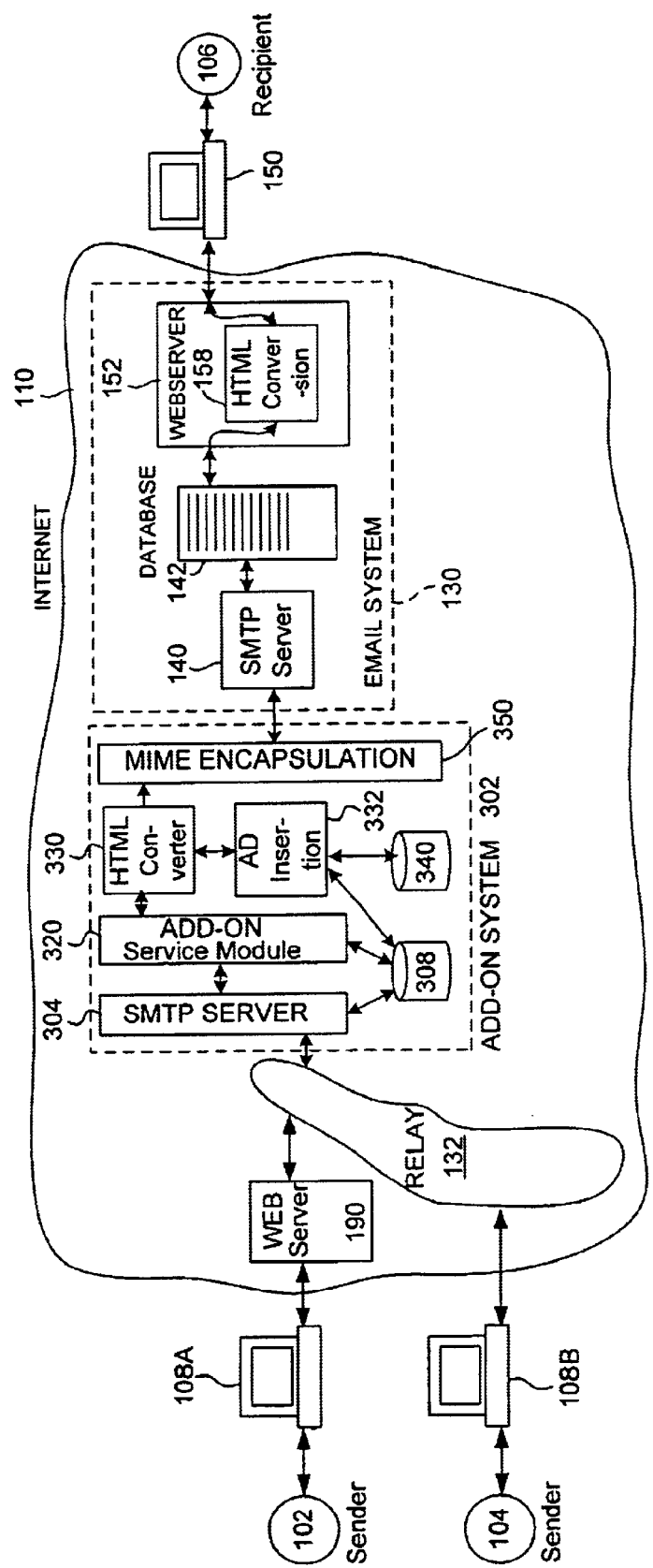
FIG. 3 shows an improved arrangement for providing add-on services for an existing email system that requires little change to the existing email system itself.

Additional features and advantages of the invention may be better understood with reference to the figures and discussions that follow. Referring now to FIG. 3, there is shown an improved arrangement for providing add-on services for an existing email system that requires little change to the existing email system itself. In FIG. 3, email system 130 is substantially similar to the email system that has been discussed earlier in connection with FIGS. 1 and 2. As before, email senders 102 and 104 represent the entities that wish to send emails to an email recipient 106 via Internet 110. In addition, there is further shown in FIG. 3 a add-on service system 302, representing the relay node wherein the advertisement-supported add-on services are implemented.

In the example of FIG. 3, users who wish to subscribe to an add-on service are provided with an email address that includes not only the domain of the destination email system (e.g., email system 130) but also the domain name of add-on service system 302. Preferably, the email address is constructed such that it appears to all other relay nodes in Internet 110 to be destined for add-on service system 302 to ensure proper routing thereto. By way of example, if the user's email address prior to subscription to the add-on services is "abc@xyz.com", the email address that is assigned to that user after the user subscribes to the add-on services may be, for example, "abc@xyz.middleware.com" wherein "middleware.com" represents the domain name of the add-on service system. When so specified, emails sent from one % E; of email senders 102 and 104 first arrive at add-on service system 302 using the conventional store-and-forward paradigm common for email transmission via the Internet.

Depending on the protocol employed for email transmission, an appropriate server is employed at add-on service system 302 to receive the email. In the example of FIG. 3, the SMTP protocol may be employed and thus the email is received by an SMTP server 304. One job of SMTP server 304 is to ascertain from the received email the identity of the recipient. If the recipient is a person or entity serviced by add-on service system 302 (the information pertaining to which may be provided to add-on service system 302 in advance by email system 130), SMTP server 304 then forwards the received email to an add-on service module 320. Add-on service module 320 represents the logic module wherein any add-on service that the recipient has subscribed to may be provided. To ascertain the type of add-on service that the recipient has subscribed to, add-on service module 320 may access a database of user information 308 to access the user profile of the recipient. Alternatively of course, SMTP server 304 may access database of user information 308 in advance and forward the information pertaining the add-on services to add-on service module 320.

At any rate, add-on service module 320 receives the email from SMTP server 304 and performs the add-on service(s) responsive to the information in database of user information 308. By way of example, some of the add-on services may include one or more of the following: virus scanning, anti-spamming, paging, auto-redirection of the received email to another domain, auto-reply back to the sender with a pre-selected message, conversion of the information contained in the email to voice or fax or another medium, anonymizing the sender identity, dispatching (i.e., filtering and/or sorting, and directing the filtered/sorted emails to separate folders or email boxes), mailing list, security encryption prior to forwarding to the destination email system, and the like.

After the add-on service is provided, the email received at add-on service system 302 may be forwarded to destination email system 130 using the domain name specified in the email address. However, some add-on services may not result in the email received at add-on service system 302 being forwarded to destination email system 130. By way of example, if the add-on service is anti-spamming, a spam email may not be forwarded to destination email system 130 at all. Still some other add-on services, such as auto-redirection, may cause the email received at add-on service system 302 to be forwarded in its original format or in some other format to another system in Internet 110.

Assuming that the nature of the add-on service is such that recipient 106 also receives a copy of the email that arrives at add-on service system 302 after the add-on service is performed, the email is then passed from add-on service module 320 to an HTML converter facility 330, which converts the email format to a protocol that may be displayed on the browser. Of course if another protocol is involved, converter facility 330 may implement that protocol in place of HTML. As a further example, if the email is to be converted to a fax or an audio file to be presented to the recipient in a voicemail system, an appropriate text-to-TIFF converter or text-to-speech converter may be employed, and subsequently inserted advertisement(s) should be tailored to the appropriate medium and format employed. The fact that the inventive technique allows the advertisement inserted to be tailored to the format and/or medium other than the format and/or medium of the original email, which format change is caused by the intervening add-on service(s), is a unique aspect of the present invention.

To simplify the discussion, assuming that recipient wishes to receive email in the HTML format after add-on services are performed. After conversion to HTML, an electronic advertisement insertion module 332 may then access database of user profile 308 to ascertain the appropriate advertisement(s) to be inserted into the HTML-formatted email. In one embodiment, the appropriate advertisements are selected based on historical data pertaining to the online or even offline behavior pattern of the recipient. By way of example, user profile 308 may contain information pertaining to the online purchase history of the recipient or his profile of interests or hobbies (based on, for example, either a profile furnished by the recipient in advance or by tracking the websites, webpages, or previous advertisements that the recipient has visited or acted upon when surfing the web or reading emails, which are then fed back to user profile 308 to build up the user profile over time). As a further example, user profile 308 may contain the credit card purchase history of the recipient, which may include off line purchasing activities (e.g., credit card purchases at brick-and-mortar businesses, for example). With the information contained in user profile 308, it may then be possible to data mine to ascertain the goods or services that the recipient is likely to desire and to target the advertisement(s) accordingly. In another embodiment, however, the advertisement may simply be pre-selected without regard for a specific user's profile or history, in the same manner that radio or television advertisements are currently employed.

Once the appropriate advertisement(s) are ascertained for the recipient, electronic advertisement insertion module 332 then accesses a database of advertisement inserts 340 to select the appropriate advertisement(s) to be inserted into the email. The advertisement(s) selected may take various forms, including without limitation one or more of audio, still banner, animation, video clips, each with or without HTML links.

It should be noted that although the database of user information 308 and database of advertisement inserts 340 are shown to be part of add-on service system 302, they may in one embodiment be implemented at a different website or server accessible to add-on service system 302. By way of example, there exist many services in the Internet that aggregate and track user click profiles (i.e., web navigation profile) and/or purchasing profile. Such datastores of user information may be accessed by add-on service system 302 to support its determination of the appropriate advertisement(s) to deploy. Similarly, the database of advertisement inserts 340 may be implemented at a different website or server accessible to add-on service system. By way of example, there exist many services that act as "clearing houses" for advertisement banners for various subscribing websites. Such datastores of advertisement inserts may be accessed by add-on service system 302 to acquire the appropriate advertisement(s) to insert into the email. By employing outsourced databases, it is now even simpler to provide advertisement-based add-on services for an existing email system.

Note that HTML conversion and electronic advertisement insertion occur, in one embodiment, after the performance of add-on services. Although this sequence is not absolutely necessary, it is nevertheless advantageous since the performance of the add-on services may result in the email being discarded (e.g., in the case of emails that contain viruses or spam emails), changed in the format and/or medium (e.g., to fax or audio). In these cases, the fact that the electronic insertion is performed after the performance of the add-on services allows the advertisement insertion operation to be omitted altogether or allows the advertisement(s) to be more appropriately chosen for the format and/or medium of the message finally presented to the recipient.

Once the received email is packaged with the appropriate electronic advertisement insert(s), it is then relayed to the destination email system. As part of the relay operation, the email may be encapsulated using a suitable protocol such as MIME (Multi-Purpose Internet Mail Extensions). This takes place in encapsulation module 350 of FIG. 3. At this point, the header of the email to be forwarded is filled out with the domain name of the destination email system 130. Thereafter, forwarding of the email to email system 130 takes place in a conventional manner to allow recipient 106 to access the relayed email, including the electronic advertisement insert(s).

Figure 4:
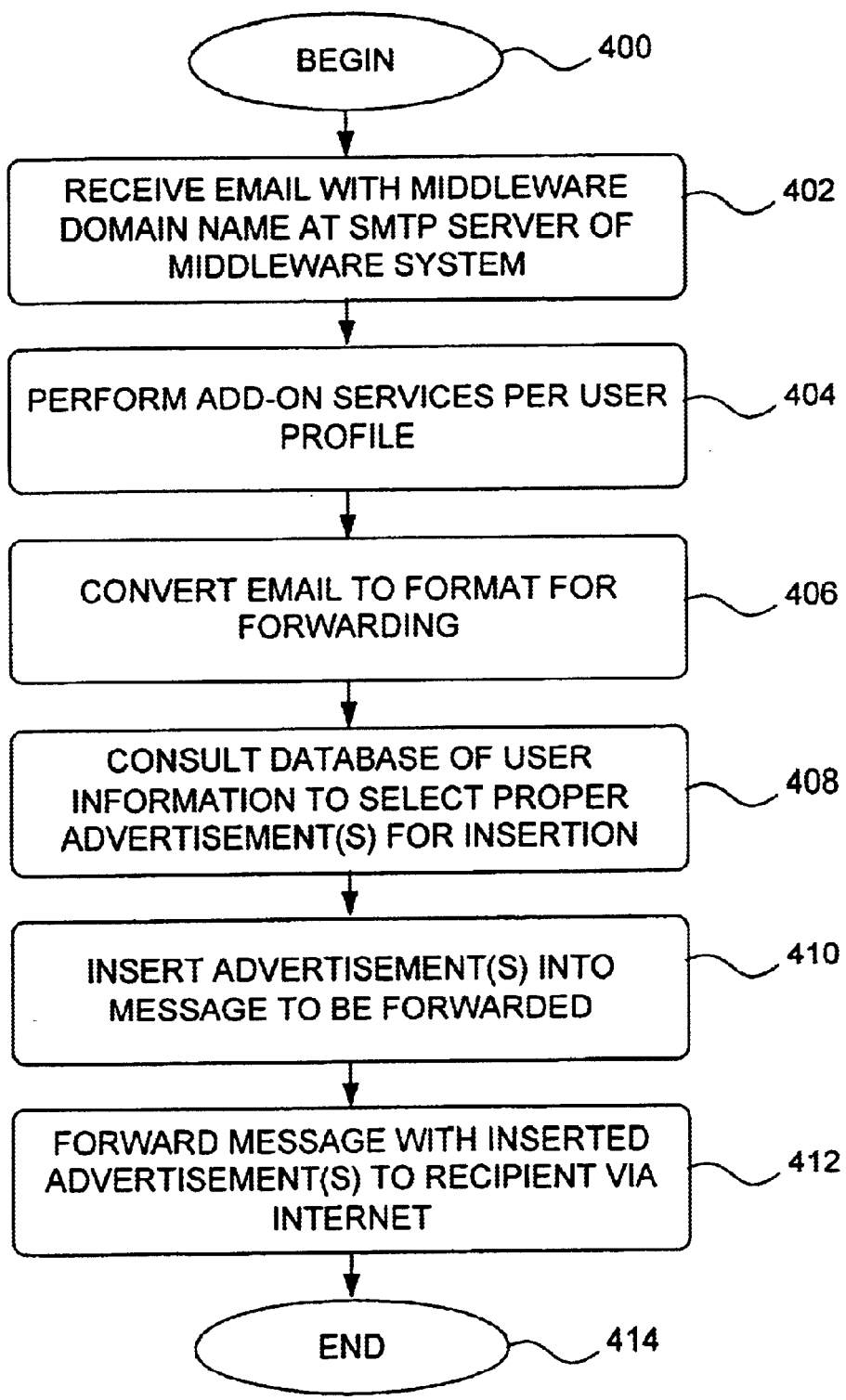
FIG. 4 illustrates, in accordance with one embodiment of the present invention, the computer-implemented method for providing add-on services for existing email systems.

FIG. 4 illustrates, in accordance with one embodiment of the present invention, the computer-implemented method for providing advertisement-based add-on services for existing email systems. In step 402, the email is received at the SMTP server of the add-on service system. With reference to FIG. 3, SMTP server 304 receives the email after it is relayed through the relay points in Internet 110. In step 404, the add-on services are provided in accordance with the information contained in the user profile. In step 406, the email is then converted into an appropriate format for presentation to the recipient (e.g., HTML). In step 408, the data base of user information is consulted for the appropriate advertisement insert(s) to be included with the email to be forwarded to the recipient. In step 410, the appropriate advertisement insert(s) are then incorporated into the email body. In step 412, the email, along with the advertisement insert(s), is then forwarded to the destination email system to be subsequently accessed by the recipient.

Some email users may resent having to switch to a different email address in order to take advantage of the add-on services. By way of example, an email user may view the task of updating all their acquaintances and friends with the new email address (e.g., the email address that includes the domain of the add-on service system as discussed in connection with FIG. 3) to be too onerous a burden. For such a user, it is necessary to provide the add-on services without requiring a concomitant change to his email address.

Figure 5:
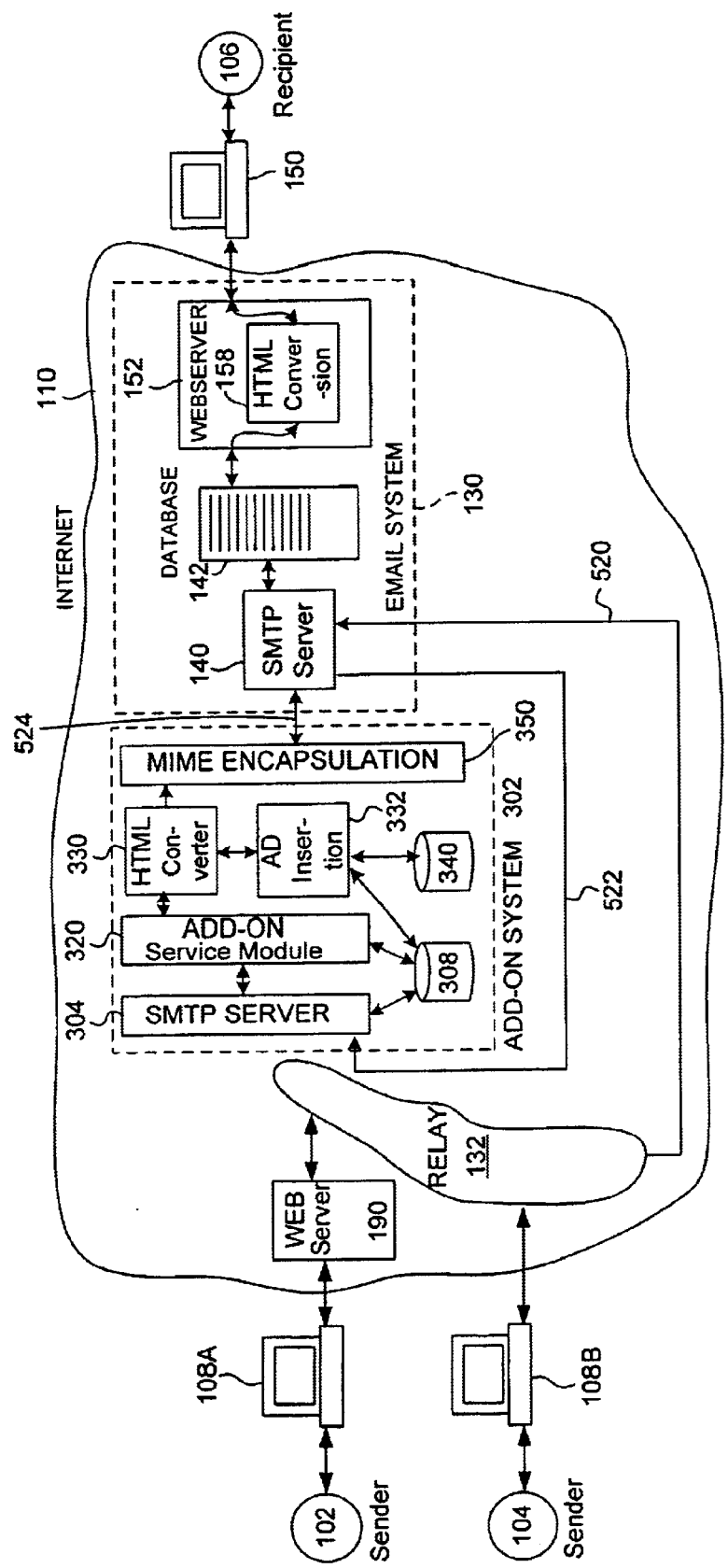
FIG. 5 illustrates, in accordance with one embodiment of the present invention, another arrangement for providing add-on services to an existing email system without requiring a change in the recipient email address and significant change in the software and/or hardware at the existing email system

FIG. 5 illustrates, in accordance with one embodiment of the present invention, another arrangement for providing advertisement-based add-on services to an existing email system without requiring a change in the recipient email address and significant change in the software and/or hardware at the existing email system. In FIG. 5, the components that have the same reference number as those of FIG. 3 function in a substantially similar manner. To allow the recipient to keep the same email address (e.g., "abc@xyz.com"), a minimal level of cooperation is required of email system 130 to redirect the incoming emails associated with users who subscribe to the add-on services to add-on service system 302.

In the embodiment of FIG. 5, all emails pertaining to users associated with a given domain name, whether they subscribe to add-on services or not, are sent first to the destination email system (e.g., email system 130 in FIG. 5). The transmission of emails from relay arrangement 132 to email system 130 is shown in FIG. 5 by path 520. In one embodiment, SMTP server 140 of email system 130 is provided with a lookup directory module that looks up the recipient subscription profile (stored in some table or database 510 accessible to email system 130) to ascertain whether the recipient, who is identified by the email address in the header of the incoming email, is a subscriber of an add-on service. If so and if the received email has not already been routed once to the add-on service system, the email is then sent to add-on service system 302 where add-on services may be performed (and optionally the advertisement inserts may be included) in the manner previously discussed. The transmission of the email from email system 130 to add-on service system 302 is illustrated in FIG. 5 by path 522.

In one embodiment, the email to be sent to add-on service system 302 is provided with the domain name of add-on service system 302 in the header of the message to be relayed using the traditional store-and-forward paradigm for Internet emails. After add-on services are performed, the email may be passed back to email system 130 via path 524 of FIG. 5 to be accessed by the recipient. Thereafter, the email is received at email system 130 and checked to see whether it has been sent once to add-on service system 302. The check is necessary to avoid endlessly sending back and forth the email between email system 130 and add-on service system 302. By way of example, SMTP server 140 may keep track of emails that have been sent to add-on service system 302 using some unique identifier (which may be inherent in the received email message or may represent an additional unique identifier assigned by SMTP server 140) to avoid resending such emails to the same add-on service system twice. Alternatively or additionally, add-on service system 302 may include some unique identifying code with the emails passed back to email system 130, which unique indentifying code is known to SMTP server 140, to ensure that emails do not get recirculated multiple times between email system 130 and the same add-on service system 302. Alternatively or additionally, add-on service system 302 may employ a different port to pass emails to email system 130, which signifies to email system 130 that the emails received on the this different port have already had the add-on services performed thereon.

If the email received at SMTP server 140 is ascertained to have been sent to add-on service system 302 once or if it belongs to a user who did not subscribe to the add-on services, the email is then passed on to database facility 142 to facilitate subsequent user retrieval in the conventional manner.

Figure 6:
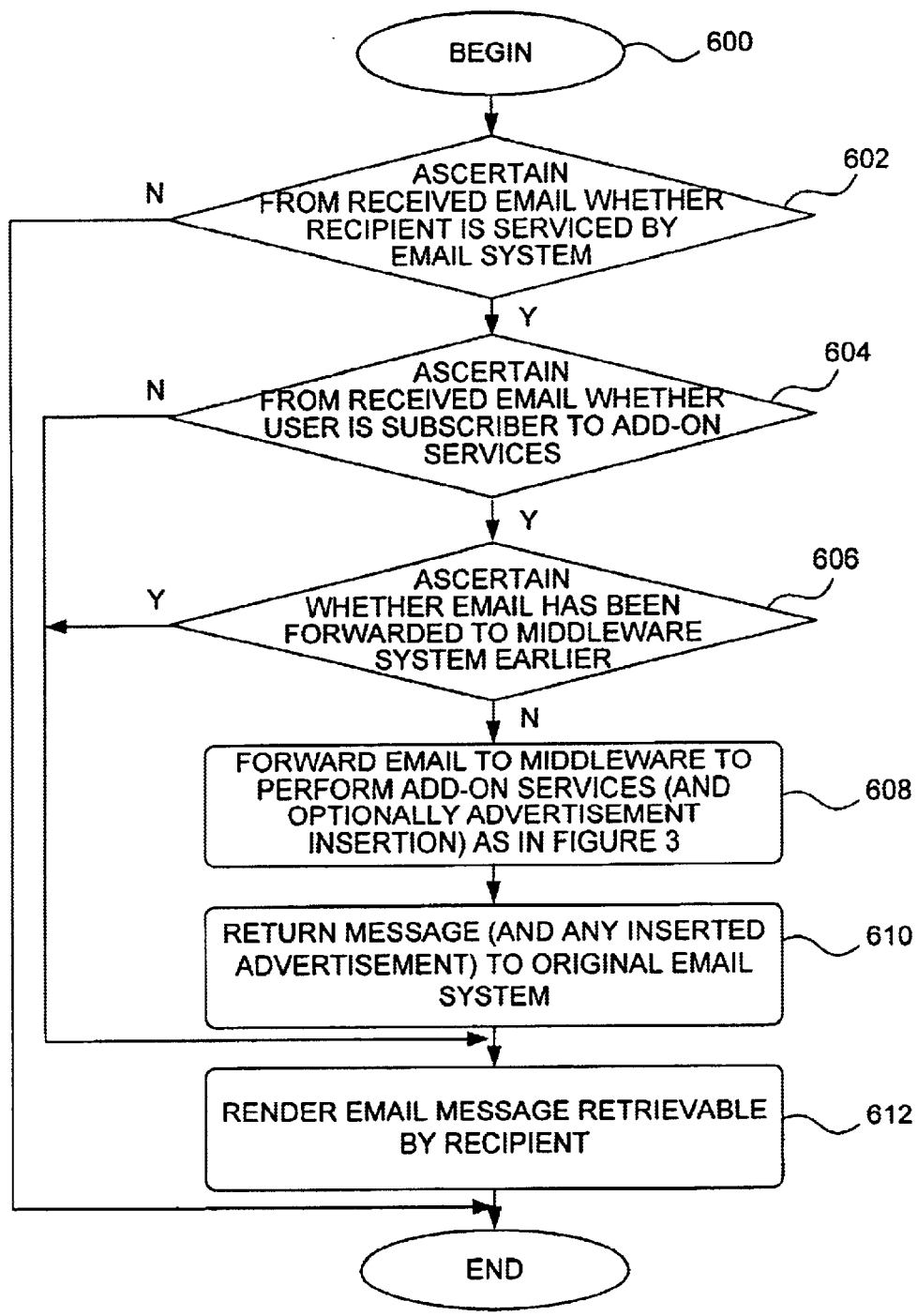
FIG. 6 is a flowchart illustrating, in accordance with one embodiment of the present invention, the steps taken by the email system to facilitate the performance of add-on services at a add-on service system without substantial changes to the email system and without requiring the recipient to change his email address.

FIG. 6 is a flowchart illustrating, in accordance with one embodiment of the present invention, the steps taken by email system 130 to facilitate the performance of add-on services at a add-on service system without substantial changes to email system 130 and without requiring the recipient to change his email address. The add-on services are performed responsive to the receipt of emails addressed to recipients who subscribed to such add-on services. In step 602, the email is received at the SMTP server at the destination email system and ascertained whether the recipient specified by the email address (obtained from the email header) is one who is serviced by the email system. If so, a further check is performed in step 604 wherein the database of user information is consulted to determine whether the recipient subscribes to any of the add-on services to be offered at the add-on service system.

If the recipient is a subscriber, a further check may be performed in step 606 wherein it is ascertained whether the email has been forwarded before to the add-on service system. As discussed, the check in step 606 is configured to prevent the email from being forwarded to the add-on service system repeatedly. If the received email belongs to a recipient who subscribes to at least one add-on service to be performed at the add-on service system and that email has not been forwarded to the add-on service system before, the method proceeds to step 608 wherein the email is forwarded to the appropriate add-on service system to have the add-on service(s) performed and the advertisement insert(s) incorporated therewith. Further details pertaining to step 610 may be obtained by reviewing FIGS. 3 and 4, which are discussed earlier herein.

After add-on services are performed and any advertisement(s) are included, the email is returned to the original destination email system in step 610. In step 612, the email is rendered accessible for retrieval by the recipient.

Note that although some minimal change is required to facilitate the routing by email system 130 of emails associated with add-on service subscribers to add-on service system 302, and to avoid routing such emails to add-on service system 302 multiple times unnecessarily, the changes required are minimal compared to those ordinarily required to integrate the add-on service codes into the codes of email system 130. As such, reliability risks and the time-to-market required to implement such add-on services and to offer them on an advertisement-supported basis are vastly reduced.

Note that in the latter embodiment, the reliability risk may be reduced even further by storing at email system 130 a copy of the email received prior to rerouting that email to add-on service system 302. Thus if there is a crash at add-on service system 302, the email copy stored at email system 130 is still available and may be retrievable by recipient 106. The same safeguard may also be built into the implementation of FIG. 3 wherein SMTP server 304 may immediately forward a copy of the email received at add-on service system 302 to email system 130 prior to performing the add-on services. The add-on services and the insertion of the advertisement(s) may be performed on the copy at add-on service system 302. Once the add-on services are performed and the advertisements are inserted into the email, that email may be forwarded to email system 130 to replace the first copy threat (i.e., the copy without the add-on service(s) being performed thereon and without the advertisements inserted). If the copy from add-on service system 302 fails to arrive within a specified time period or if email system 130 is notified of a failure at add-on service system 302, the first copy received may be made available to recipient 106, and an optional message reporting the failure may be sent to the operator of email system 130 and/or recipient 106 to allow these parties to act accordingly (e.g., to perform the anti-virus operation at the recipient computer since the add-on anti-virus service was not performed at add-on service system 302 due to a failure thereat).

One particularly advantageous feature of the implementation of FIG. 5 is the ability to allow recipients to specify not only the type of add-on service desired but also the vendor offering the service if there are multiple vendors implement multiple competing add-on service systems 302. By way of example, the recipient may specify in his subscriber profile both the add-on services desired and the vendor to be used for each of the add-on services to allow the email system 130 to route the email to the appropriate add-on service system(s). If multiple vendors and/or multiple add-on service systems are involved, the codes in SMTP server 140 at email system 130 may route the emails to the add-on service system at each vendor in turn (or parallelly if appropriate) until all the add-on services subscribed by the recipient (and optionally advertisement insertions) are performed. As an added advantage, this paradigm also allows unlimited scalability since the number of add-on service systems for each type of add-on service may be increased as desired to handle increased subscription. If multiple add-on service systems are provided to handle the increased load, SMTP server 140 may track the relative load at each add-on service system and may load-balance among the add-on service systems offering the same add-on service to ensure a speedy response.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for providing add-on services responsive to an email message transferred via a distributed computer network, comprising: receiving using SMTP protocol via said distributed computer network said email message at a destination email-system, wherein said destination email system comprises an email server through which said email message is received, ascertaining from said email message whether a recipient of said email message subscribes to at least one of said add-on services by consulting a user profile database, if the recipient of said email message subscribers to at least one of said add-on service system, at least one of said add-on services on said email message; forwarding said email message to a relay point where a middle ware module is implemented to form a post add-on service email message; forming a post add-on service email message by performing using said add-on service system, at least one of said add-on services on said email message; forwarding using a SMTP protocol said post add-on service email message, after said forming step, to an email server of a destination email system that services the recipient; rendering said post add-on service email message accessible to said recipient through said destination email system.

2. The method of claim 1 wherein said performing said at least one of said add on services at said add-on service system comprises incorporating an electronic advertisement into said post add-on service email prior to said forwarding.

3. The method of claim 2 wherein said electronic advertisement is selected from the group consisting of an advertising banner, an audio file, and a video file.

4. The method of claim 2, wherein the distributed computer network is the Internet.

5. An add-on service system configured to provide add-on services to email messages transferred via a distributed computer network, sadi add-on service system being configured to be coupled to a destination email system through said distributed computer network, said add-on service system comprising: a furst server configured to receive according to a SMPTP protocol, through said distributed computer network, an email message eventually destined for said destination email system, said email message including an address of said add-on service system and recipient identifier; a first server configured to receive according to a SMTP protocol, through said distributed computer network, an email message eventually destined for said destination email system, said email messages including an address of said add-on service system and recipient identifier; a first logic module, operatively coupled to receive said email message from said first server, for ascertaining whether a recipient of said email message subscribes to at lets one of said add-on service by consulting a user profile database; If said first logic module ascertains that said recipient of said email message subscribes to at least one of said add-on services, forwarding said email message to a relay point where a middleware module is implemented to form a post add-on service email message; and a second server, operatively coupled to receive said post add-on service email message from said middleware module, said second server being configured to forward said post add-on service email message to an email server of said destination email system using a SMTP protocol.

6. The add-on service system of claim 5 further including an advertisement insertion module configured to incorporate an electronic advertisement as part of said post add-on service email.

7. The method of claim 1 wherein said rendering said post add-on service email message accessible, comprises allowing an email front end to access said email through said destination email system.

8. The method of claim 1 wherein said email server of said destination email system comprises an SMTP server.

9. The method of claim 1 wherein said destination email system is a legacy email system.

10. The method of claim 1 further comprising forwarding said email message from said destination email system to said add-on service, wherein said forwarding stores said email message in said destination email system, and further comprising rendering said email message accessible to said recipient if said add-on service system fails.

11. The method of claim 1 wherein said rendering said post add-on service email message accessible to said recipient comprises allowing an email front end to access said post add-on service email message through said destination email system.

12. The add-on service system of claim 5 wherein said server is and SMTP server and said second server is an encapsulation module.

13. The add-on service system of claim 12 wherein said encapsulation module is able to provide MIME encapsulation.

14. A method of claim 1, further comprising: providing the recipient an option of selecting at least one add-on service; providing the recipient the choice of at least two vendors for said at least one add-on service; determining which add-on service has been selected by the recipient; determining which vendor has been selected by the recipient; and wherein the forwarding the email message to a relay point, comprises sending a first portion of the email message as an email message to the vendor selected by the recipient.

* * * * *

UNITED STATES PATENT AND TRADEMARK OFFICE
CERTIFICATE OF CORRECTION

PATENT NO.   : 6,836,792 B1
DATED        : December 28, 2004
INVENTOR(S)  : Samuel Chen It is certified that error appears in the above-identified patent and that said Letters Patent is hereby corrected as shown below:

Column 2,
Line 31, change "RTML-formatted" to -- HTML-formatted --.

Column 12,
Line 37, change "sadi add-on" to -- said add-on --.
Line 40, change "furst server" to -- first server --.
Line 41, change "SMPTP protocol" to -- SMTP protocol --
Line 52, change "at lets" to -- at least --.

Column 13,
Line 11, change "service," to -- service system, --.

Column 14,
Line 1, change "wherein said" to -- wherein said first --.
Line 2, change "and SMTP" to -- an SMTP --.

Signed and Sealed this

Seventeenth Day of May, 2005

JON W. DUDAS
*Director of the United States Patent and Trademark Office*